United States Patent
Pan

(10) Patent No.: US 9,843,676 B1
(45) Date of Patent: *Dec. 12, 2017

(54) TRANSCRIPTION OF COMMUNICATIONS THROUGH A MOBILE DEVICE

(71) Applicant: Sorenson IP Holdings, LLC, Salt Lake City, UT (US)

(72) Inventor: Jasper Cheekeong Pan, Draper, UT (US)

(73) Assignee: SORENSON IP HOLDINGS, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/481,277

(22) Filed: Apr. 6, 2017

Related U.S. Application Data

(60) Continuation of application No. 14/938,797, filed on Nov. 11, 2015, now Pat. No. 9,622,052, which is a
(Continued)

(51) Int. Cl.
*H04W 4/00* (2009.01)
*H04M 3/42* (2006.01)
(Continued)

(52) U.S. Cl.
CPC ......... *H04M 3/42391* (2013.01); *G10L 15/26* (2013.01); *G10L 15/30* (2013.01);
(Continued)

(58) Field of Classification Search
CPC . H04L 65/1069; H04L 67/14; H04M 2242/30
(Continued)

(56) References Cited

U.S. PATENT DOCUMENTS 4,268,721 A 5/1981 Nielson et al.
5,909,482 A 6/1999 Engelke
(Continued)

FOREIGN PATENT DOCUMENTS

EP 1032224 A2 8/2000

OTHER PUBLICATIONS

Ultratec, Inc,. Compac C Manual: Using your Compact/C; Third Edition, Jun. 2002, 33 pages.

*Primary Examiner* — Kiet Doan
(74) *Attorney, Agent, or Firm* — Maschoff Brennan

(57) ABSTRACT

A method to transcribe communications is provided. The method may include obtaining first communication data during a communication session between a first communication device and a second communication device and transmitting the first communication data to the second communication device by way of a mobile device that is locally coupled with the first communication device. The method may also include receiving, at the first communication device, second communication data from the second communication device through the mobile device and transmitting the second communication data to a remote transcription system. The method may further include receiving, at the first communication device, transcription data from the remote transcription system, the transcription data corresponding to a transcription of the second communication data, the transcription generated by the remote transcription system and presenting, by the first communication device, the transcription of the second communication data.

20 Claims, 7 Drawing Sheets

Related U.S. Application Data division of application No. 14/044,586, filed on Oct. 2, 2013, now Pat. No. 9,191,789.

(51) Int. Cl.
| | | |
|---|---|---|
| *G10L 15/26* | (2006.01) | |
| *H04W 4/12* | (2009.01) | |
| *G10L 15/30* | (2013.01) | |
| *H04M 3/493* | (2006.01) | |
| *H04M 1/725* | (2006.01) | |

(52) U.S. Cl.
CPC ..... *H04M 1/72591* (2013.01); *H04M 3/4936* (2013.01); *H04W 4/12* (2013.01); *H04M 2201/40* (2013.01)

(58) Field of Classification Search
USPC ........ 455/466, 566, 417; 379/265.09, 88.01; 705/3, 2; 348/468
See application file for complete search history.

(56) References Cited

U.S. PATENT DOCUMENTS

| | | |
|---|---|---|
| 5,974,116 A | 10/1999 | Engelke et al. |
| 5,978,654 A | 11/1999 | Colwell et al. |
| 6,075,841 A | 6/2000 | Engelke et al. |
| 6,075,842 A | 6/2000 | Engelke et al. |
| 6,233,314 B1 | 5/2001 | Engelke |
| 6,307,921 B1 | 10/2001 | Engelke et al. |
| 6,493,426 B2 | 12/2002 | Engelke et al. |
| 6,504,910 B1 | 1/2003 | Engelke et al. |
| 6,510,206 B2 | 1/2003 | Engelke et al. |
| 6,549,611 B2 | 4/2003 | Engelke et al. |
| 6,567,503 B2 | 5/2003 | Engelke et al. |
| 6,594,346 B2 | 7/2003 | Engelke |
| 6,603,835 B2 | 8/2003 | Engelke et al. |
| 6,748,053 B2 | 6/2004 | Engelke et al. |
| 6,778,824 B2 | 8/2004 | Wonak et al. |
| 6,882,707 B2 | 4/2005 | Engelke et al. |
| 6,885,731 B2 | 4/2005 | Engelke et al. |
| 6,914,996 B2 | 7/2005 | Takeda |
| 6,934,366 B2 | 8/2005 | Engelke et al. |
| 7,003,082 B2 | 2/2006 | Engelke et al. |
| 7,006,604 B2 | 2/2006 | Engelke |
| 7,069,006 B2 | 6/2006 | Wonak et al. |
| 7,164,753 B2 | 1/2007 | Engelke et al. |
| 7,319,740 B2 | 1/2008 | Engelke et al. |
| 7,327,981 B2 | 2/2008 | Hundal |
| 7,555,104 B2 | 6/2009 | Engelke |
| 7,660,398 B2 | 2/2010 | Engelke et al. |
| 7,881,441 B2 | 2/2011 | Engelke et al. |
| 8,213,578 B2 | 7/2012 | Engelke et al. |
| 8,264,990 B2 | 9/2012 | Levin et al. |
| 8,379,801 B2 | 2/2013 | Romriell et al. |
| 8,416,925 B2 | 4/2013 | Engelke et al. |
| 8,463,257 B1 | 6/2013 | Shaoul |
| 8,478,316 B2 | 7/2013 | Gould et al. |
| 8,908,838 B2 | 12/2014 | Engelke et al. |
| 8,917,821 B2 | 12/2014 | Engelke et al. |
| 8,917,822 B2 | 12/2014 | Engelke et al. |
| 2003/0236091 A1 | 12/2003 | Wonak et al. |
| 2008/0187108 A1 | 8/2008 | Engelke et al. |
| 2008/0319745 A1 | 12/2008 | Caldwell et al. |
| 2010/0031180 A1 | 2/2010 | Shin et al. |
| 2010/0323728 A1 | 12/2010 | Gould et al. |
| 2011/0170672 A1 | 7/2011 | Engelke et al. |
| 2012/0250837 A1 | 10/2012 | Engleke et al. |
| 2012/0327812 A1 | 12/2012 | Xiao et al. |
| 2012/0329518 A1 | 12/2012 | Garg |
| 2013/0029722 A1 | 1/2013 | Drader et al. |
| 2013/0170361 A1 | 7/2013 | Manyakin, Jr. et al. |
| 2013/0244705 A1* | 9/2013 | Gould ............... H04M 3/42391 455/466 |
| 2014/0032125 A1* | 1/2014 | Hawkins ................ G06F 19/28 702/19 |

\* cited by examiner

TRANSCRIPTION OF COMMUNICATIONS THROUGH A MOBILE DEVICE

CROSS-REFERENCE TO RELATED APPLICATIONS

This patent application is a continuation of U.S. patent application Ser. No. 14/938,797, filed on Nov. 11, 2015, and issued as U.S. Pat. No. 9,622,052 on Apr. 11, 2017, which is a divisional of U.S. patent application Ser. No. 14/044,586, filed on Oct. 2, 2013, and issued as U.S. Pat. No. 9,191,789 on Nov. 17, 2015, which are incorporated herein by reference in their entireties.

FIELD

Embodiments of the present disclosure relate to transcription of communications through a mobile device.

BACKGROUND

Communication devices for the hearing-impaired have been developed. Such communication devices may include a text-captioned phone with amplified audio, and text captioning services. As a result, hearing-impaired users that have at least some hearing capabilities may participate in the conversation by listening and speaking. The text-captioned phone also enables hearing-impaired users to read a text caption of at least part of the conversation.

Hearing-impaired individuals often have access to communication devices for the hearing-impaired. Hearing-impaired individuals may also own mobile phones. Mobile phones offer many conveniences, including portable audio communications. Individuals with significant hearing loss, however, may not communicate effectively with conventional mobile phones because conventional mobile phones are typically not loud enough for hearing-impaired individuals. In addition, conventional mobile phones are not typically configured to provide text-captioning services. When a user is engaged in a call on a mobile phone, however, the user may prefer to use a caption device that communicates with a relay service. It may be inconvenient to end the call on the mobile phone, and initiate a second call with the caption device.

SUMMARY

In some embodiments, the present disclosure comprises a communication system. The communication system comprises a caption device. The caption device is configured to establish communication with a mobile device, receive a text signal originating at a relay service, the text signal corresponding to a transcript of a far-end voice signal originating at a far-end device, and display a text caption corresponding to the text signal on a display of the caption device.

In some embodiments, the present disclosure comprises a method of facilitating a captioned conversation between a far-end user and a near-end user having a caption device. The method comprises establishing communication between the caption device and a mobile device, and establishing communication between the caption device and a relay service for communicating a text signal between the relay service and the caption device. The text signal comprising a text transcript corresponding to a far-end voice signal transmitted to the mobile device from a far-end device.

In some embodiments, the present disclosure comprises a communication system including a relay service. The relay service is receive a far-end voice signal from at least one of a caption device and a mobile device while the caption device and the mobile device are in communication with each other. The far-end voice signal originates at a far-end device in a call with the mobile device. The relay service is further configured to transmit a text signal comprising a text transcript corresponding to at least the far-end voice signal to the caption device.

In some embodiments, the present disclosure comprises a mobile device. The mobile device is configured to establish communication with a caption device, receive a far-end voice signal originating at a far-end device, and transmit the far-end voice signal to a relay service configured to generate a text signal comprising a text transcript corresponding to the far-end voice signal.

DETAILED DESCRIPTION

Figure 1:
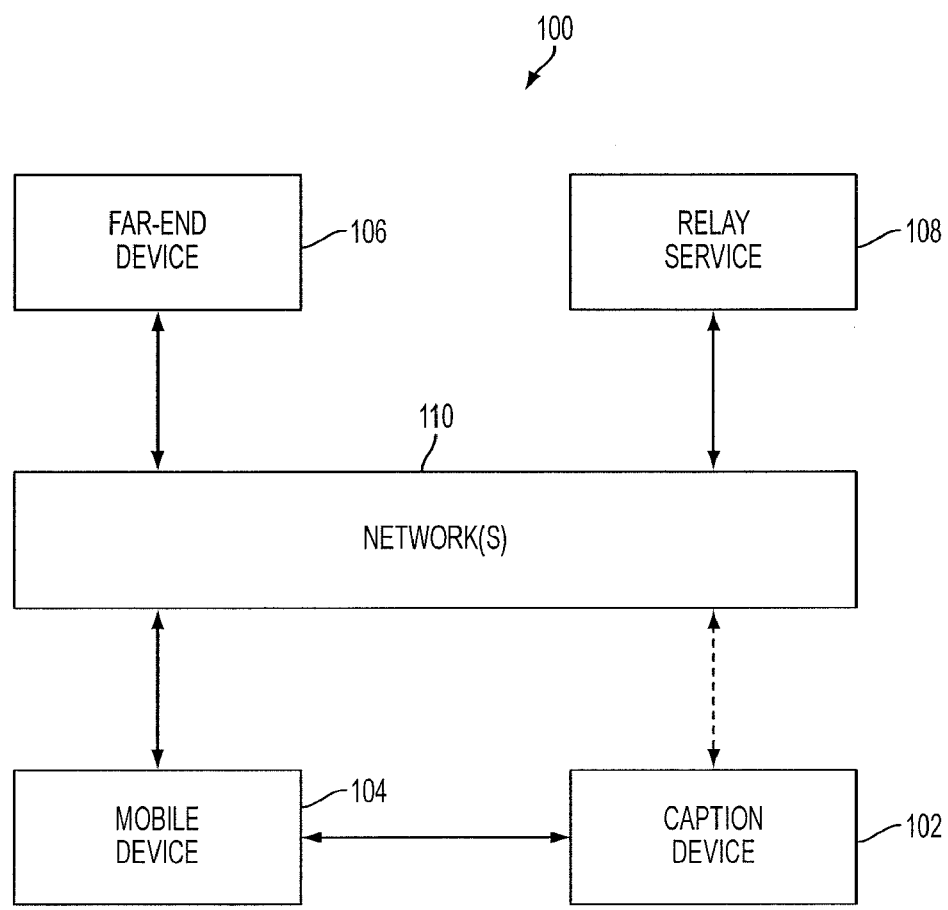
FIG. 1 is a simplified block diagram of a communication system according to an embodiment of the present disclosure.

In the following detailed description, reference is made to the accompanying drawings that form a part hereof, and in which is shown by way of illustration, specific embodiments in which the present disclosure may be practiced. These embodiments are described in sufficient detail to enable those of ordinary skill in the art to practice the present disclosure. It should be understood, however, that the detailed description and the specific examples, while indicating examples of embodiments of the present disclosure, are given by way of illustration only and not by way of limitation. From this disclosure, various substitutions, modifications, additions, rearrangements, or combinations thereof within the scope of the present disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely idealized representations that are employed to describe various embodiments of the present disclosure. Accordingly, the dimensions of the various features may be arbitrarily expanded or reduced for clarity. In addition, some of the drawings may be simplified for clarity.

Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the present disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware, software, or a combination thereof, depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g., 110). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Embodiments of the present disclosure include systems and methods for using a caption device for mobile communication. Embodiments of the present disclosure are generally described herein with reference to captioning mobile communication for the hearing impaired. It should be noted, however, that embodiments of the present disclosure may include any application or environment where captioning audio from a mobile communication device is desirable. For example, it is contemplated that embodiments of the present disclosure may include captioning audio or video streams received by the mobile communication device for hearing-impaired or hearing-capable users.

Although the term "real-time" is used throughout the description for the hearing-impaired user to hear the far-end voice and view the corresponding caption during a conversation, it is recognized that there may be at least some delay. Thus, the term "real-time" does not require that there is no delay.

FIG. 1 is a simplified block diagram of a communication system 100 according to an embodiment of the present disclosure. The communication system 100 may include a caption device 102, a mobile communication device 104 (also referred to herein as "mobile device 104"), a far-end device 106, a relay service 108, and one or more networks 110 (sometimes referred to herein as "the networks 110"). The communication system 100 may facilitate communication between at least two users wherein at least one of users is using the caption device 102 and another user is using the far-end device 106. At least one of the users may be a hearing-impaired (e.g., hard of hearing) user who desires to listen to the conversation with the assistance of the caption device 102. Thus, the hearing-impaired user of the caption device 102 may have at least some hearing and speaking capabilities. The caption device 102 may enable the hearing-impaired user to participate in the conversation (e.g., speaking and listening), as well as to read a text caption of at least a portion of the conversation. For example, the relay service 108 may generate a transcript of at least the far-end user's side of the conversation. The relay service 108 may transmit the transcript to the caption device 102 to be displayed on the caption device 102 as a caption during the conversation. As a result, the hearing-impaired user may be able to view, in real-time, the words spoken by the far-end user during the conversation. The far-end user may be a hearing-capable user using a conventional communication device having no captioning capabilities. In some embodiments, the far-end user may be another hearing-impaired user communicating with their own caption device. For example, the far-end device 106 may be a caption device that is also configured to communicate with the relay service 108 to receive a text transcript of the near-end user's side of the conversation to be displayed as a caption during the conversation.

Some hearing-impaired users may also have a mobile device 104 that they may use to communicate with others. Typically, the mobile device 104 and the caption device 102 have different identification numbers (e.g., phone number, IP address, etc.). Thus, the far-end user may attempt to reach the hearing-impaired user by calling either the mobile device 104 or the caption device 102. In some circumstances, the mobile device 104 may not have captioning capabilities. Thus, if the far-end user calls the mobile device 104 (or if the hearing-impaired user calls out from the mobile device 104), the hearing-impaired user may have a "voice only" call that is not supplemented with captioning services.

The mobile device 104 may be further configured to establish communication between the caption device 102 and the mobile device 104 during a call between the mobile device 104 and the far-end device 106. As a result, a call between the far-end device 106 and the mobile device 104 may utilize the captioning capabilities of the caption device 102 and the relay service 108 even if the mobile device 104 itself is not configured for captioning. Some embodiments may include the mobile device 104 having captioning capabilities, but the hearing-impaired user may nevertheless desire to utilize the caption device 102 for captioning a call with the mobile device 104.

In some embodiments, the caption device 102 may be configured to communicate with the mobile device 104 through a wireless protocol, such as, for example, Bluetooth, ZigBee, Wi-Fi, other suitable protocols, and combinations thereof. In some embodiments, the caption device 102 may be configured to pair with the mobile device 104 without modifying the mobile device 104. In some embodiments, the mobile device 104 may be modified with application software configured to enable communication between the mobile device 104 and the caption device 102 through at least one of Bluetooth, ZigBee, Wi-Fi, and other wireless protocols.

In some embodiments, the caption device 102 may be configured to establish and terminate communication between the caption device 102 and the mobile device 104. Establishing the communication may occur responsive to a user input of the caption device 102. For example, the caption device 102 may present a "sync" option that the user may select. The sync option may be a sync button on the caption device 102, or a sync option displayed on a graphical user interface by the caption device 102. The caption device 102 may detect the presence of the mobile device 104 (e.g., having already been paired together previously) and display that syncing is available between the mobile device 104 and the caption device 102. In operation, the caption device 102 may establish communication with the mobile device 104 responsive to detecting a selection of the sync option. While the caption device 102 and the mobile device 104 are synced, the captioning of the conversation may be displayed on the caption device 102.

In some embodiments, the mobile device 104 may be configured to establish and terminate communication between the caption device 102 and the mobile device 104. Establishing the communication may occur responsive to a user input of the mobile device 104. For example, the mobile device 104 may present a "sync" option that the user may select. The mobile device 104 may be modified by application software to cause the mobile device 104 to display the sync option on a graphical user interface of the mobile device 104. In operation, the mobile device 104 may establish or terminate communication with the caption device 102 responsive to detecting a selection of the sync option.

In some embodiments, both the caption device 102 and the mobile device 104 may be configured to establish communication between the caption device 102 and the mobile device 104. In some embodiments, the caption device 102 and the mobile device 104 may sync automatically without user input when their presence is recognized.

The user may desire to use the audio devices (e.g., speaker, microphone) of the caption device 102 during sync mode rather than the audio devices of the mobile device 104. The near-end user may speak into a microphone 516, 616 (FIGS. 5 and 6) of the caption device 102, and listen to audio from a speaker 518, 618 (FIGS. 5 and 6) of the caption device 102. During this time, the mobile device 104 may disable its microphone and speaker. In some embodiments, the near end user may desire to use the audio devices of the mobile device 104 during sync mode. In such an embodiment, the near-end user may speak into a microphone of the mobile device 104 and listen to audio from a speaker of the mobile device 104. During this time, the caption device 102 may disable its microphone 516, 616 and speaker 518, 618. In either of these embodiments, the captioning of the conversation may be displayed on the caption device 102.

Either of the caption device 102 and the mobile device 104 may also terminate communication between the caption device 102 and the mobile device 104 while the mobile device 104 and the caption device 102 are synced. Terminating communication between the caption device 102 and the mobile device 104 may be responsive to the user un-selecting the sync option.

If the caption device 102 and the mobile device 104 are no longer is sync mode, captioning of communications from the mobile device 104 through the caption device 102 may be disabled. In some embodiments, the call may continue between the far-end device and the mobile device 104. The mobile device 104 may be free to re-sync with the caption device 102, to sync with another caption device 102, or continue without captioning. In some embodiments, exiting sync mode may terminate the call (i.e., end communication between the far-end device 106 and the mobile device 104). Other user inputs to the mobile device 104, the caption device 102, and combinations thereof, may also terminate the call.

In some embodiments, communication between the caption device 102 and the mobile device 104 may be established by operably coupling the caption device 102 to the mobile device 104 with a cable. Thus, the caption device 102 and the mobile device 104 may enter sync mode through methods other than wireless coupling. By way of non-limiting example, the caption device 102 may be configured to communicate with the mobile device 104 through a digital cable (e.g., a universal serial bus (USB) cable, Firewire cable, or Thunderbolt cable). Also by way of non-limiting example, the caption device 102 may be configured to communicate with the mobile device 104 through an analog cable, such as an analog audio cable. In some embodiments, communication between the caption device 102 and the mobile device 104 may be terminated by disconnecting the cable between caption device 102 and the mobile device 104. The mobile device 104 may be free to re-sync with the caption device 102, to sync another caption device 102, continue without captioning, or terminate the call.

In some embodiments, communication may be established between the mobile device 104 and the caption device 102 prior to a call between the mobile device 104 and the far-end device 106. For example, the mobile device 104 and the caption device 102 may be synced even before a call is placed. Thus, at least one of the caption device 102 and the mobile device 104 may enable the near-end user to receive an incoming call from, and place an outgoing call to, the far-end device 106 during communication between the caption device 102 and the mobile device 104. In such an embodiment, an incoming call from the far-end device 106 to the mobile device 104 may simply be routed to the caption device 102 automatically prior to the hearing-impaired user answers the call. In some embodiments, the caption device 102 and the call to the mobile device 104 may be answered with the caption device 102.

The relay service 108 may include a service that provides a voice-to-text translation (e.g., transcription) service. The relay service 108 may be configured to communicate with at least one of the caption device 102 and the mobile device 104 through the networks 110. The relay service 108 may be configured to generate a transcript of the far-end voice signal. In operation, the relay service 108 may be configured to receive the far-end voice signal originating at the far-end device 106 through the networks 110. The far-end voice signal may be transmitted to the relay service 108 by at least one of the caption device 102, the mobile device 104, and the far-end device 106 directly.

In some embodiments, the relay service may include speech recognition software for generating the transcript of at least the far-end voice signal. In some embodiments, a call assistant at the relay service 108 may listen to the speech corresponding to the far-end voice signal, and re-speak (e.g., re-voice) the content of the speech for the speech recognition software. In some embodiments, the call assistant listening to the speech corresponding to the voice signals may generate the transcript by typing text corresponding to the speech. In some embodiments, the far-end voice signal may be applied directly to the speech recognition software to generate the transcript of the voice signals.

The relay service 108 may transmit the transcript (e.g., as a text signal) to the caption device 102. In some embodiments, the text signal may be sent from the relay service 108 to the caption device 102 directly (through the networks 110). In some embodiments, the text signal may be sent from the relay service 108 to the caption device 102 through the mobile device 104.

The caption device 102 may be configured to receive the text signal and display the transcript of the far-end voice signal on a display 520 (FIG. 5) for the hearing-impaired user to read during the conversation.

The far-end device 106 may be a communication device configured to send and receive audio signals through the networks 110. The far-end device 106 may be configured to convert audio energy comprising speech from a user of the far-end device 106 into a far-end voice signal, and send the far-end voice signal to the mobile device 104. The far-end device 106 may include a telephone, a mobile phone, a text captioned phone, a video phone, a tablet computer, a laptop computer, a desktop computer, other suitable communication device, and combinations thereof.

The networks 110 may be configured to enable communications between the far-end device 106 and the mobile device 104. As non-limiting examples, the networks 110 may include an internet protocol (IP) network, public switched telephone networks (PSTNs), cellular phone networks, other similar networks, and combinations thereof. The network 110 may include a wide area network (WAN), a local area network (LAN), a personal area network (PAN), and combinations thereof. In some embodiments, the networks 110 may include a cloud network. The networks 110 may be configured to enable communications with the mobile device 104, the far-end device 106, the relay service 108, and in some embodiments, the caption device 102 wirelessly, through a cable, and combinations thereof. Some non-limiting examples of suitable wireless communications may include Wi-Fi, Bluetooth, and other wireless networks. Some non-limiting examples of suitable cables include fiber-optic cables, coaxial cables, traditional telephone cables, and Ethernet cables.

Figure 2:
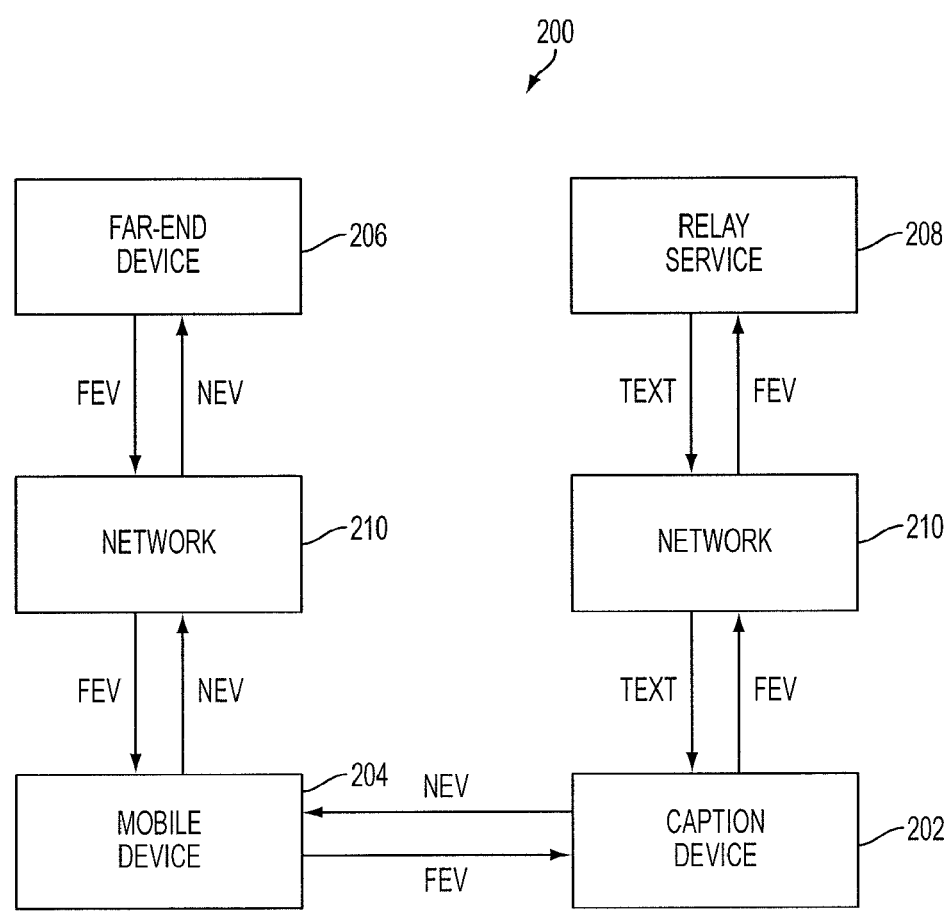
FIG. 2 is a simplified block diagram of a communication system according to an embodiment of the present disclosure.

FIG. 2 is a simplified block diagram of a communication system 200 according to an embodiment of the present disclosure. The communication system 200 may include a caption device 202, a mobile device 204, a far-end device 206, a relay service 208, and one or more networks 210. These elements may be similar to the caption device 102, the mobile device 104, the far-end device 106, the relay service 108, and the networks 110 of the communication system 100 of FIG. 1.

In operation, a communication session may be established between the far-end user (e.g., through far-end device 206) and the near-end user (e.g., through the mobile device 204). For example, the far-end user may call the near-end user's mobile device 204 or vice versa. The far-end device 206 may convert acoustic energy corresponding to far-end speech from a far-end user to a far-end voice signal FEV. The far-end device 206 may transmit the far-end voice signal FEV through the networks 210 to the mobile device 204.

If the mobile device 204 is not in communication with the caption device 202, the mobile device 204 may convert the far-end voice signal FEV to acoustic energy. The mobile device 204 may also convert acoustic energy corresponding to near-end speech from a near-end user to a near-end voice signal NEV. The mobile device 204 may transmit the near-end voice signal NEV to the far-end device 206. If there is no communication between the mobile device 204 and the caption device 202, the caption device 202 and the relay service 208 may not be utilized. Thus, the mobile device 204 and the far-end device 206 may simply communicate with each other without the caption device 202 supplementing the conversation with a text caption on its display.

The near-end user, however, may desire to supplement the conversation with a text caption corresponding to the far-end speech. Communication may be established between the mobile device 204 and the caption device 202 so that the near-end user may use the caption device 202 to display the text caption. As discussed above, the communication path may be established wirelessly (e.g., Bluetooth, Wi-Fi, etc.) or through a physical connection (e.g., cable).

If the mobile device 204 is in communication with the caption device 202, the mobile device 204 may route the far-end voice signal FEV to the caption device 202. The caption device 202 may receive the far-end voice signal FEV from the mobile device 204. The caption device 202 may transmit the far-end voice signal FEV to the relay service 208 through the networks 210. The relay service 208 may receive the far-end voice signal FEV, and generate a transcript comprising text corresponding to the far-end voice signal FEV. As discussed above, the transcript may be generated with the assistance of a call assistant, voice recognition software, and combinations thereof. The relay service 208 may transmit a text signal TEXT comprising the text corresponding to the far-end voice signal FEV to the caption device 202. The caption device 202 may display the text caption corresponding to the far-end speech during the conversation.

In some embodiments, the near-end user may desire to use the caption device 202 for both the audio and text. For example, the near-end user may use the audio elements of the caption device 202 rather than the audio elements of the mobile device 204. Thus, the caption device 202 may convert the far-end voice signal FEV to acoustic energy that produces sound for the near-end user to hear. In addition, the caption device 202 may convert acoustic energy corresponding to near-end speech to a near-end voice signal NEV. During this time, the microphone and speaker of the mobile device 204 may be disabled. The caption device 202 may transmit the near-end voice signal NEV to the mobile device 204. The mobile device 204 may receive the near-end voice signal NEV, and transmit the near-end voice signal NEV to the far-end device 206. Thus, in the embodiment shown in FIG. 2, the mobile device 204 may be used to route the far-voice signal FEV and the near-end voice signal NEV between the far-end device 206 and the caption device 202. The caption device 202 may split the far-end voice signal FEV to be transmitted to the relay service 208 as well as transmitted to the speaker of the caption device 202.

In some embodiments, the near-end user may desire to use the mobile device 204 for the audio portion of the conversation and the caption device for the caption portion of the conversation. For example, the near-end user may use the audio elements of the mobile device 204 rather than the audio elements of the caption device 202. Thus, the mobile device 204 may convert the far-end voice signal FEV to acoustic energy that produces sound for the near-end user to hear. In addition, the mobile device 204 may convert acoustic energy corresponding to near-end speech to a near-end voice signal NEV. During this time, the microphone and speaker of the caption device 202 may be disabled. The mobile device 204 may transmit the near-end voice signal NEV to the far-end device 206. Thus, in such an embodiment, the mobile device 204 may be used to route the far-end voice signal FEV from the far-end device 206 to the caption device 202. The caption device 202 may split the far-end voice signal FEV to be transmitted to the relay service 208 as well as transmitted to the speaker of the caption device 202.

Figure 3:
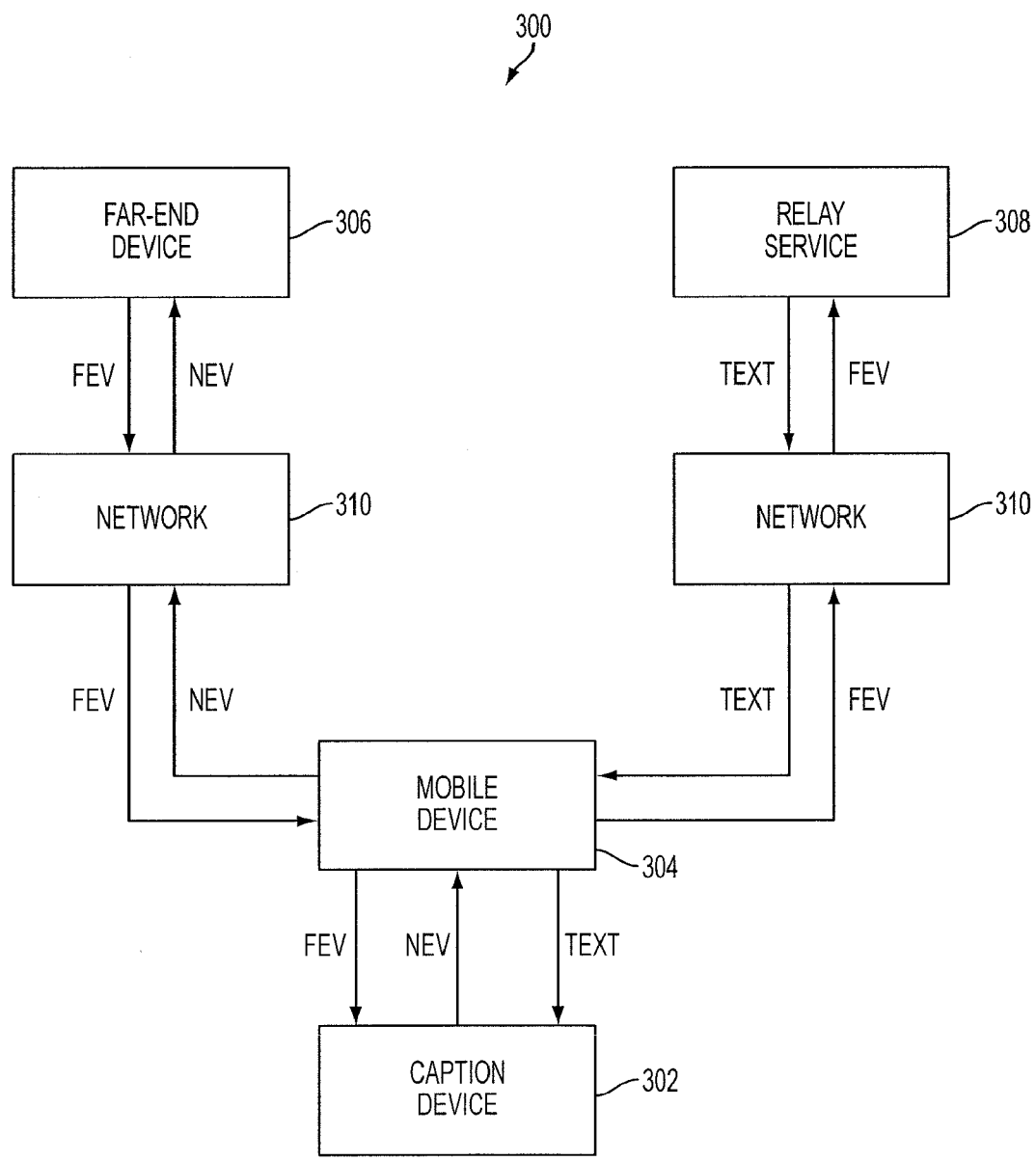
FIG. 3 is a simplified block diagram of a communication system according to an embodiment of the present disclosure.

FIG. 3 is a simplified block diagram of a communication system 300 according to an embodiment of the present disclosure. The communication system 300 may include a caption device 302, a mobile device 304, a far-end device 306, a relay service 308, and the one or more networks 310. These elements may be similar to the caption device 102, the mobile device 104, the far-end device 106, the relay service 108, and the networks 110 of the communication system 100 of FIG. 1.

In operation, a communication session may be established between the far-end user (e.g., through far-end device 306) and the near-end user (e.g., through the mobile device 304). For example, the far-end user may call the near-end user's mobile device 304 or vice versa. The far-end device 306 may convert acoustic energy corresponding to far-end speech from a far-end user to a far-end voice signal FEV. The far-end device 306 may transmit the far-end voice signal FEV through the networks 310 to the mobile device 304.

If the mobile device 304 is not in communication with the caption device 302, the mobile device 304 may convert the far-end voice signal FEV to acoustic energy. The mobile device 304 may also convert acoustic energy corresponding to near-end speech from a near-end user to a near-end voice signal NEV. The mobile device 304 may transmit the near-end voice signal NEV to the far-end device 306. If there is no communication between the mobile device 304 and the caption device 302, the caption device 302 and the relay service 308 may not be utilized. Thus, the mobile device 304 and the far-end device 306 may simply communicate with each other without the caption device 302 supplementing the conversation with a text caption on its display.

If, however, the mobile device 304 is in communication with the caption device 302, the mobile device 304 may transmit the far-end voice signal FEV to the relay service 308. The relay service 308 may receive the far-end voice signal FEV, and generate a transcript comprising text corresponding to the far-end voice signal FEV. The relay service 308 may transmit the text signal TEXT comprising the text corresponding to the far-end voice signal FEV to the mobile device 304. The mobile device 304 may receive the text signal TEXT, and transmit the text signal TEXT and the far-end voice signal FEV to the caption device 302.

The caption device 302 may also receive the far-end voice signal FEV and the text signal TEXT from the mobile device 304. The caption device 302 may convert the far-end voice signal FEV to acoustic energy to be heard by the near-end user. The caption device 302 may also display the text corresponding to the text signal TEXT. In addition, the caption device 302 may convert acoustic energy corresponding to near-end speech to a near-end voice signal NEV. The caption device 302 may transmit the near-end voice signal NEV to the mobile device 304. The mobile device 304 may receive the near-end voice signal NEV, and transmit the near-end voice signal NEV to the far-end device 306.

As shown in FIG. 3, the mobile device 304 may be configured to route each of the far-end voice signal FEV, the near-end voice signal NEV, and the text signal TEXT to and from the caption device 302. As a result, the caption device 302 need not directly communicate through the networks 310, such as through a phone line, or the internet. Thus, a direct connection from the caption device 302 to the network 310s may not be required for providing captioning. Rather, the access to the networks 310 may be through the mobile device 304, with the caption device 302 merely having a local connection to the mobile device 304. The mobile device 304 may route the near-end voice NEV and far-end voice FEV between the caption device 302 and the far-end device 306, and further route the far-end voice FEV and the text signal TEXT between the caption device 302 and the relay service 308. Thus, the caption device 302 may be a portable caption device that may be taken wherever the near-end user goes. Consequently, caption services from the relay service 308 may be provided to hearing-impaired users wherever a mobile network (e.g., cellular network and/or data network) is available for the mobile device 304 to communicate.

Figure 4:
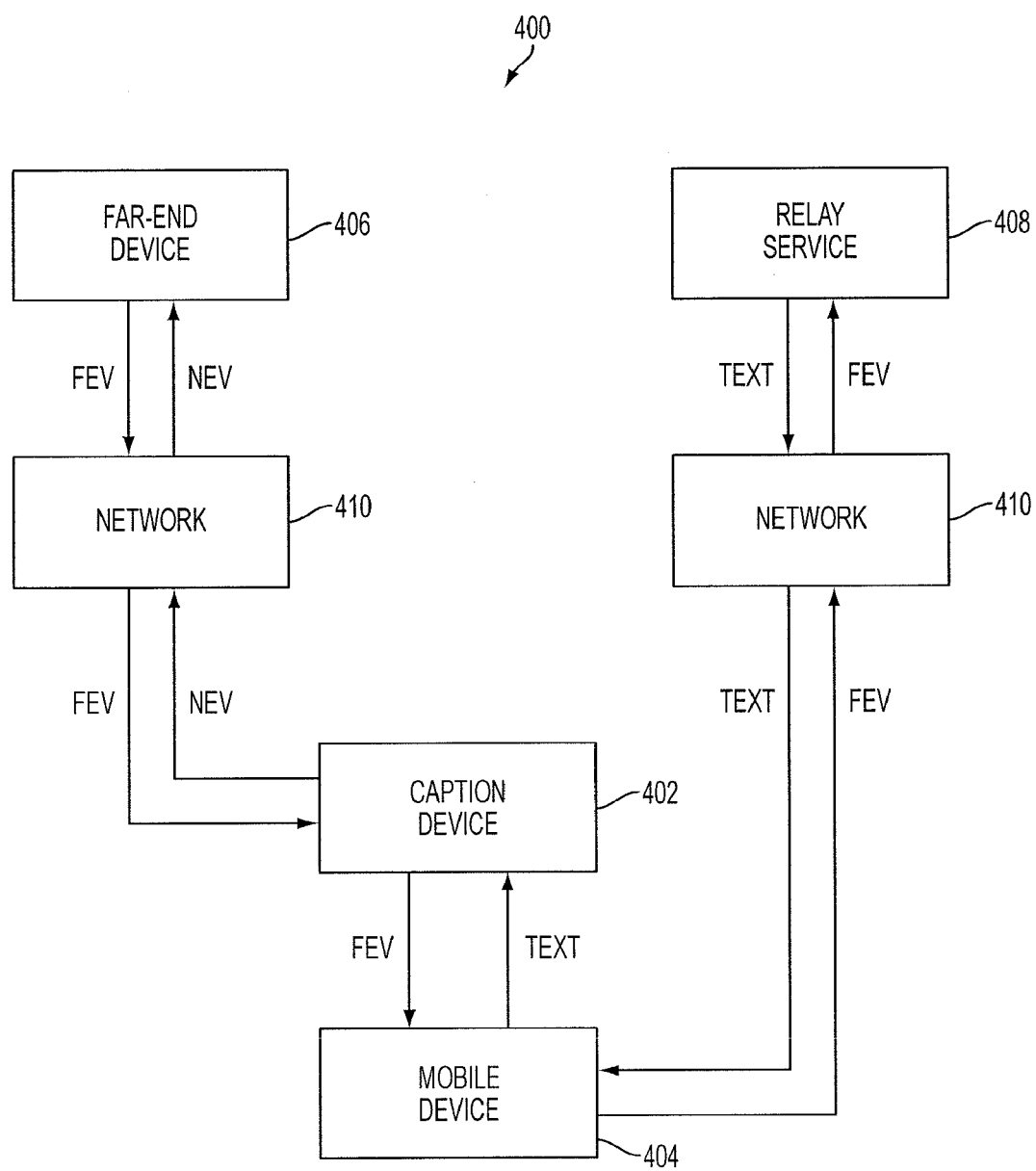
FIG. 4 is a simplified block diagram of a communication system according to an embodiment of the present disclosure.

FIG. 4 is a simplified block diagram of a communication system 400 according to an embodiment of the present disclosure. The communication system 400 may include a caption device 402, a mobile device 404, a far-end device 406, a relay service 408, and one or more networks 410. These elements may be similar to the caption device 102, the mobile device 104, the far-end device 106, the relay service 108, and the networks 110 of the communication system 100 of FIG. 1.

In operation, a communication session may be established between the far-end user (e.g., through far-end device 406) and the near-end user (e.g., through the caption device 402). For example, the far-end user may call the near-end user's caption device 402 or vice versa. The far-end device 406 may transmit the far-end voice signal FEV through the networks 410 to the caption device 402. The caption device 402 may transmit the near-end voice signal NEV through the networks 410 to the far-end device 406. Communication may be established between the mobile device 404 and the caption device 402 so that mobile device 404 may route signals (e.g., the far-end voice signal FEV and the text signal TEXT) between the caption device 402 and the relay service 408.

In the embodiment of FIG. 4, the caption device 402 and the far-end device 406 may communicate directly, whereas the caption device 402 and the relay service 408 may communicate with each other through the mobile device 404. With the mobile device 404 configured to route the far-end voice signal FEV and the text signal TEXT between the caption device 402 and the relay service 408, the caption device 402 may require relatively little bandwidth in communicating through the networks 410 to the relay service 408. The caption device 402 may also utilize a single connection to an external network if the mobile device provides access to its external networks.

Figure 5:
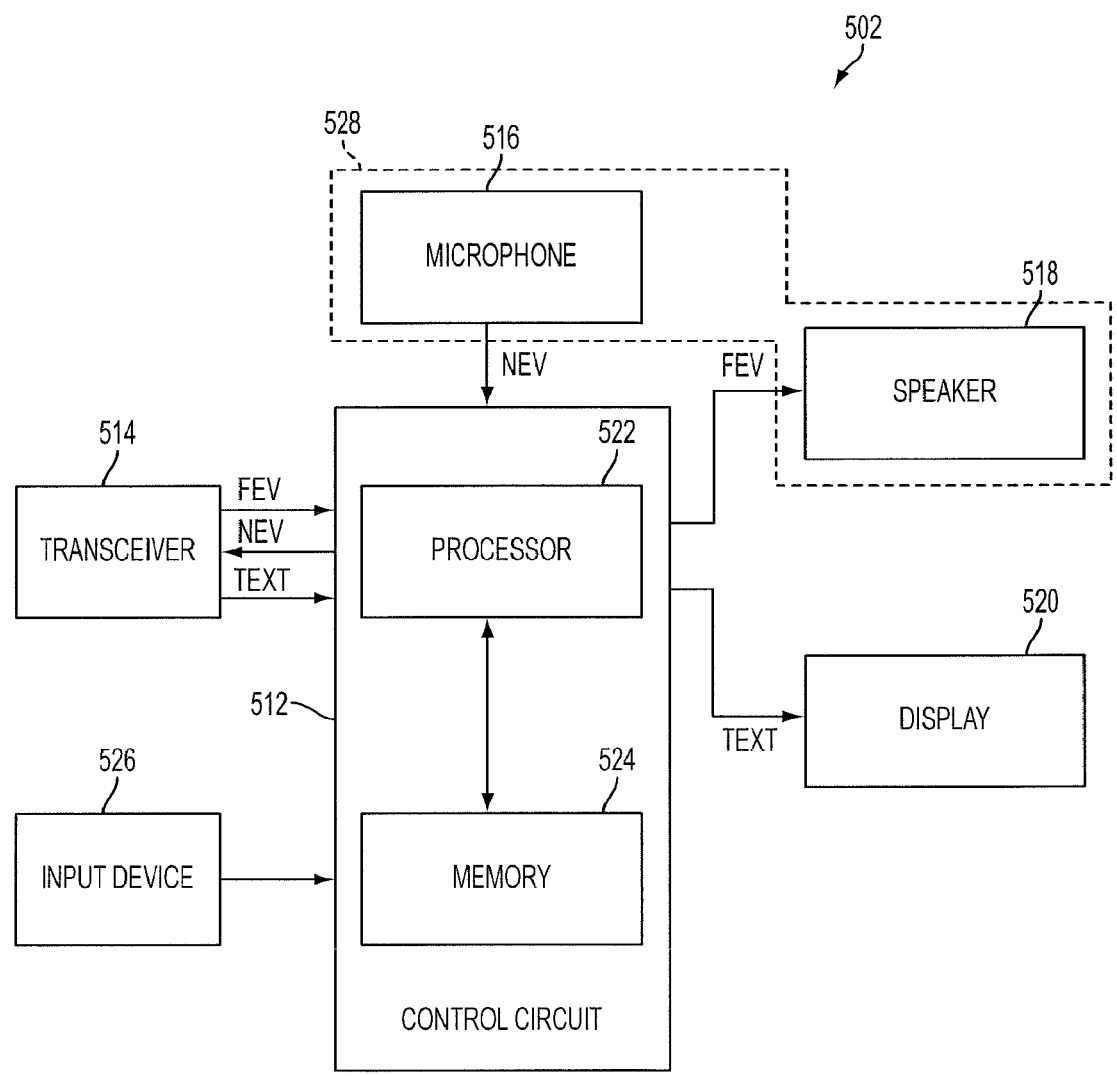
FIG. 5 is a simplified block diagram of a caption device according to an embodiment of the present disclosure.

FIG. 5 is a simplified block diagram of a caption device 502. The caption device 502 may include a control circuit 512 operably coupled to a transceiver 514, a microphone 516, a speaker 518, a display 520, and an input device 526. The control circuit 512 may include at least a processor 522 operably coupled to a memory device 524. The processor 522 may comprise any of a microcontroller, a field programmable gate array (FPGA), a central processing unit (CPU), an application-specific integrated circuit (ASIC), other processors, and combinations thereof. The processor 522 may be configured to execute machine-readable commands stored on the memory device 524. The memory device 524 may be a computer-readable medium, comprising any of a random access memory (RAM), a read-only memory (ROM), a Flash memory, other suitable memory devices, and combinations thereof.

The transceiver 514 may be configured to communicate with a mobile device 104, 204, 304, and 404 (FIGS. 1, 2, 3, and 4). The transceiver 514 may be configured to send near-end voice signals NEV to the mobile device 104, and receive far-end voice signals FEV originating at the far-end device 106 from the mobile device 104. In some embodiments, the transceiver 514 may include a wireless transceiver including an antenna configured to convert radio waves to electrical signals, and vice versa. By way of non-limiting example, the transceiver 514 may include a Bluetooth transceiver, a Wi-Fi transceiver, other suitable wireless transceivers, and combinations thereof. In some embodiments, the transceiver 514 may include a wired transceiver. By way of non-limiting example, the transceiver 514 may include an electrical connector configured to interface with a cable connector. Also by way of non-limiting example, the electrical connector may include a 2.5 mm socket, a 3.5 mm socket, a USB socket, other suitable connectors, and combinations thereof.

In some embodiments, the transceiver 514 may also be configured to receive text signals TEXT originating at the relay service 208 from the mobile device 204 wirelessly (FIG. 2), through wired communications, and combinations thereof. In some embodiments, the transceiver 514 may be configured to receive the text signals TEXT from the relay service 208 through the networks 210 (FIG. 2). By way of non-limiting example, the transceiver 514 may comprise a telephone (RJ11) socket, a FireWire (IEEE 1394) socket, an Ethernet (e.g., RJ45) socket, other suitable connector, and combinations thereof.

The transceiver 514 may be configured to receive the near-end voice signal NEV from the control circuit 512, and provide the far-end voice signal FEV and the text signal TEXT to the control circuit 512. The control circuit 512 may be configured to provide the far-end voice signal FEV to the speaker 518, and the text signal TEXT to the display 520. The control circuit 512 may receive the near-end voice signal NEV from the microphone 516, and provide the near-end voice signal NEV to the transceiver 514. In some embodiments, the control circuit 512 may modify the format of the signals FEV, NEV, TEXT. By way of non-limiting example, the text signal TEXT received by the control circuit 512 may be a text stream, and the text signal TEXT provided to the display 520 may be a video stream.

The microphone 516 may comprise an audio input device configured to convert acoustic energy to electrical signals. By way of non-limiting example, the microphone 516 may include any of a dynamic microphone, a condenser microphone, a piezoelectric device, a light modulation device, other suitable audio input devices, and combinations thereof. The microphone 516 may be configured to generate the near-end voice signal NEV corresponding to acoustic energy from a near-end user's speech.

The speaker 518 may comprise an audio output device configured to convert electrical signals to acoustic energy. By way of non-limiting example, the speaker 518 may include a dynamic loudspeaker, a multiple loudspeaker system, a coaxial driver, a headphone speaker, and other suitable electro-acoustic transducers. In some embodiments, the speaker 518 may be an amplified speaker to accommodate hearing-impaired users. The speaker 518 may be configured to receive the far-end voice signal FEV, and convert the far-end voice signal FEV to acoustic energy. In some embodiments, the microphone 516 and the speaker 518 may optionally be integrated together in a handset 528 or headset (not shown). In some embodiments, the microphone 516 and the speaker 518 may be integrated in a speakerphone configuration.

The display 520 may comprise an electronic display device. By way of non-limiting example, the display 520 may include a liquid crystal display (LCD), a plasma display, a light-emitting diode (LED) array, a projection display, a cathode ray tube (CRT) display, other suitable displays, a segmented display, and combinations thereof. In some embodiments, the display 520 may be implemented in a housing 630 (FIG. 6) together with the control circuit 512. By way of non-limiting example, the display 520 may comprise a screen integrated with the caption device 502.

In some embodiments, the display 520 may be implemented separately from the control circuit 512. By way of non-limiting example, the display 520 may be operably coupled to the caption device 502 with a video cable. The video cable may comprise a component video cable, a high-definition multimedia interface (HDMI) cable, a video graphics array cable, a digital visual interface (DVI) cable, a component video cable, an S-video cable, a composite video cable, a coaxial cable, other suitable cables, and combinations thereof. The display 520 may be configured to receive and display the text signal TEXT.

The input device 526 may include a mouse, a keyboard, one or more buttons, switches, keys, other input devices, and combinations thereof. In some embodiments, the control circuit 512 may be configured to cause the transceiver 514 to establish communication with the mobile device 104 responsive to a user selecting a sync option with the input device 526. By way of non-limiting example, the input device 526 may include a sync button that may be pressed by the user. The control circuit 512 may also be configured to cause the transceiver 514 to terminate communication with the mobile device 104 responsive to the user selecting the sync option with the input device 526. In some embodiments, the input device 526 may include a keypad for dialing telephone numbers.

In some embodiments, the display 520 and the input device 526 may be implemented together as a touch-screen interface. In such embodiments, the sync option may be presented on the touch-screen interface, and a user may select the sync option by touching the sync option on the touch-screen interface.

Figure 6:
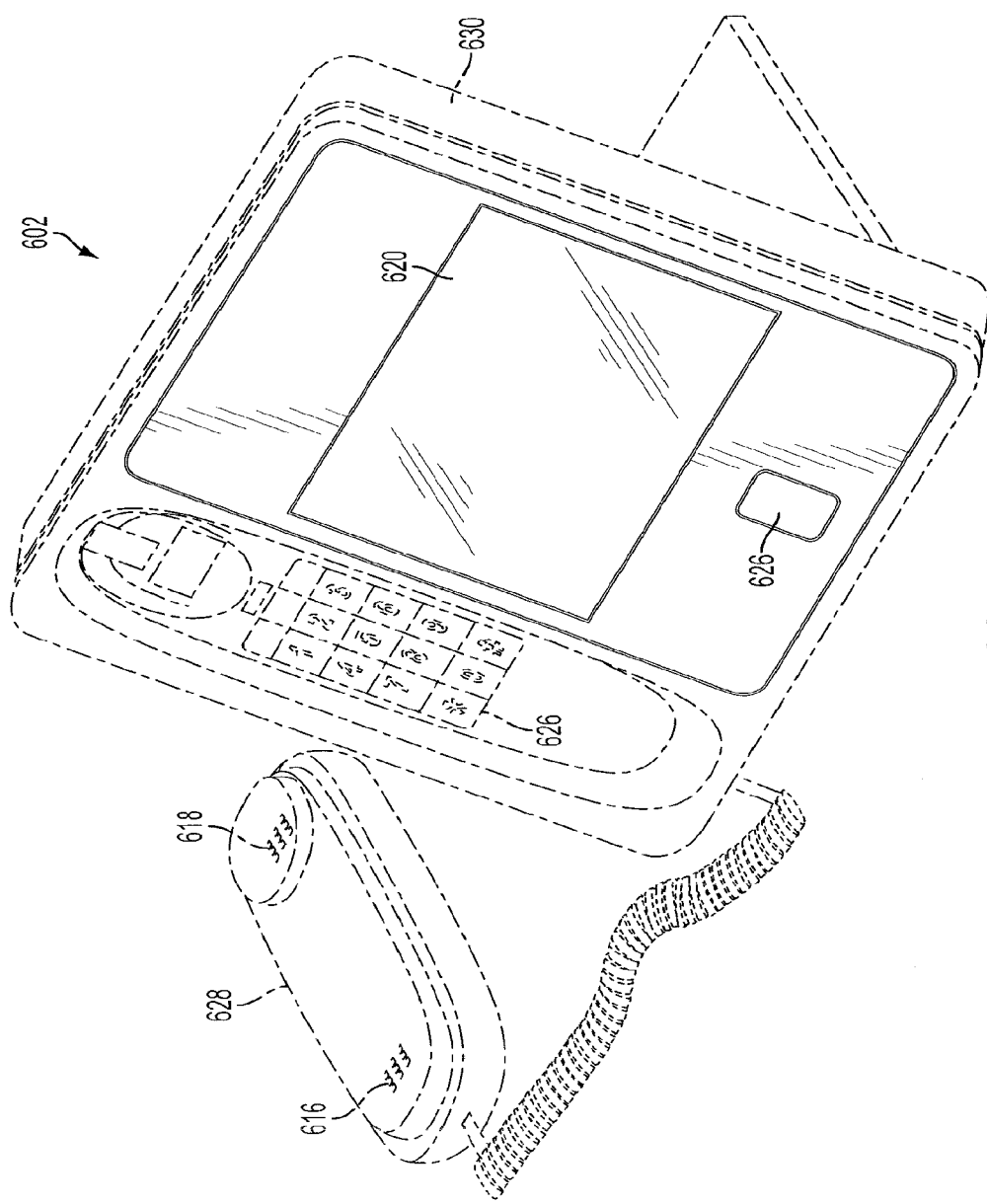
FIG. 6 is a simplified perspective view of a caption device according to an embodiment of the present disclosure.

FIG. 6 is a simplified perspective view of a caption device 602. The caption device 602 may include a housing 630 configured to enclose the control circuit 512 and the transceiver 514 (FIG. 5). The caption device 602 may include a handset 628 comprising a microphone 616 and a speaker 618. The caption device 602 may also include a display 620, and an input device 626. In some embodiments, the display 620 may be flush with the housing 630.

The display 620 may be configured to display a caption corresponding at least to the far-end user's side of the conversation. The input device 626 may be a menu button configured to present the user with menu options on a graphical user interface (GUI) on the display 620. The display 620 may be a touch screen display. Thus, the GUI may present the near-end user with a sync option, which may be selectable by pressing the corresponding location on the display 620. In some embodiments, the sync option may be selected by pressing a physical button. For example, the input device 626 may be a sync button that the user may select if the user desires to establish communication between the mobile device 104 (FIG. 1) and the caption device 602. The input device 626 may include both a sync button and a menu button.

Figure 7:
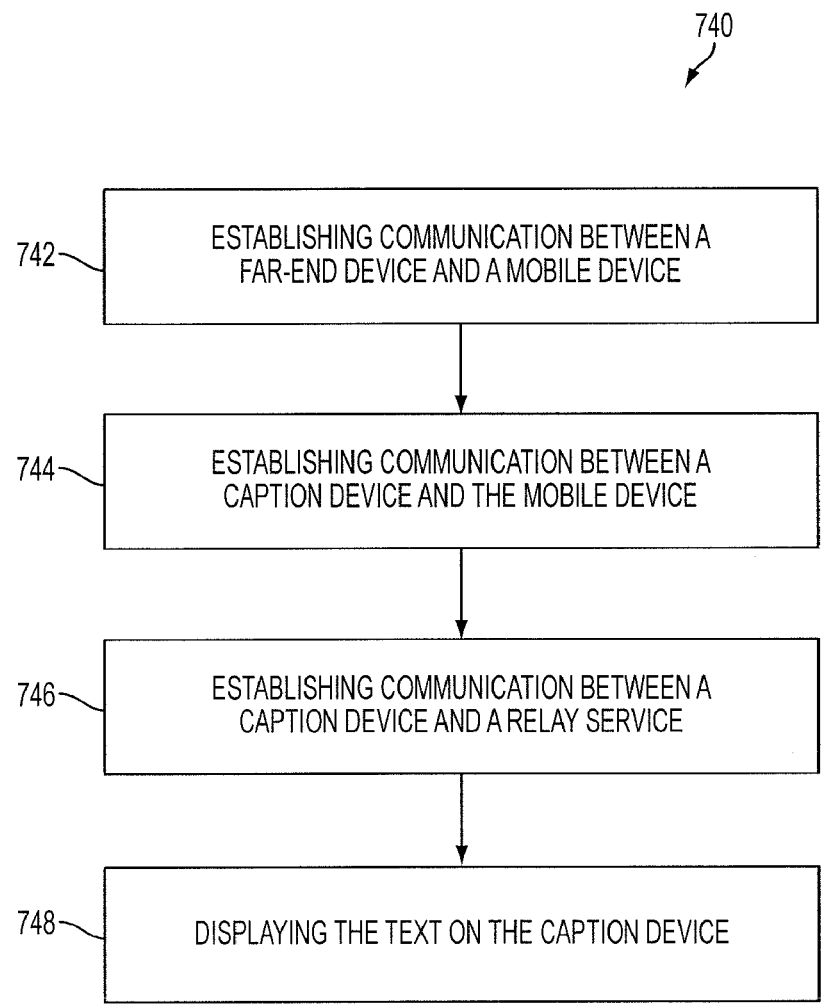
FIG. 7 is a simplified flowchart illustrating a method of facilitating a captioned conversation between a far-end user and a near-end user having a caption device.

FIG. 7 is a simplified flowchart 740 illustrating a method of facilitating a captioned conversation between a far-end user and a near-end user having a caption device 102, 202, 302, 402, 502, 602 (FIGS. 1 through 6). For convenience, the reference numerals associated with FIG. 1 are used, but the method described herein is understood to apply to any of FIGS. 1 through 6.

At operation 742, communication between a far-end device 106 and a mobile device 104 may be established. In some embodiments, establishing communication between the far-end device and the mobile device 104 may comprise the mobile device 104 placing an outgoing call to, or receiving an incoming call from, the far-end device 106.

At operation 744, communication between the caption device 102 and the mobile device 104 may be established. The communication may be established wirelessly responsive to a user selecting a sync option presented by one of the caption device 102 and the mobile device 104. In some embodiments, wireless communication between the caption device 102 and the mobile device 104 may be established automatically when their presence is recognized. In some embodiments, establishing communication between the caption device 102 and the mobile device 104 comprises operably coupling the caption device 102 to the mobile device 104 with a cable. Establishing communication between the caption device 102 and the mobile device 104 may be performed prior to the far-end device 106 and the mobile device 104 entering into a call.

At operation 746, the method may comprise establishing communication between the caption device 102 and a relay service 108. If the caption device 102 and the relay service 108 are in communication, a text signal TEXT may be transmitted from the relay service 108 to the caption device 102. The text signal TEXT may comprise a text transcript corresponding to a far-end voice signal FEV originating at a far-end device 106 in communication with the mobile device 104. In some embodiments, establishing communication between the caption device 102 and the relay service 108 may include receiving, at the caption device 102, the text signal TEXT from the relay service 108. For example, receiving the text signal TEXT from the relay service 108 may include receiving the text signal TEXT at the caption device 102 directly from the relay service 108. Also, receiving the text signal TEXT from the relay service 108 may include receiving the text signal TEXT from the relay service 108 through the mobile device 104. In some embodiments, establishing communication between the caption device 102 and the relay service 108 may include routing the far-end voice signal FEV from the far-end device 106 to the relay service 108 through the caption device 102. In some embodiments, establishing communication between the caption device 102 and the relay service 108 may include routing the text signal TEXT from the relay service 108 to the caption device 102 through the mobile device 104.

At operation 748, the method may comprise displaying the text from the text signal TEXT on the caption device 102. The text may be a text caption of at least the far-end user's side of the conversation to supplement the corresponding voice during real-time communication.

As used herein, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventor.

What is claimed is:

1. A method to transcribe communications, the method comprising:
    obtaining, at a first communication device, first communication data during a communication session between the first communication device and a second communication device;
    transmitting the first communication data to the second communication device by way of a device that is locally coupled with the first communication device;
    receiving, at the first communication device, second communication data from the second communication device through the device;
    transmitting the second communication data to a remote transcription system;
    receiving, at the first communication device, transcription data from the remote transcription system, the transcription data corresponding to a transcription of the second communication data, the transcription generated by the remote transcription system; and
    presenting, by the first communication device, the transcription of the second communication data.

2. The method of claim 1, wherein the second communication data includes audio data or the audio data and video data.

3. The method of claim 2, wherein when the second communication data includes the audio data and the video data, only the audio data is transmitted to the remote transcription system.

4. The method of claim 1, further comprising establishing local communication between a first communication device and the device in a sync mode.

5. The method of claim 4, wherein establishing local communication between the first communication device and the device in the sync mode is responsive to at least one of the device or the first communication device automatically detecting a presence of another of the at least one of the device or the first communication device without user input.

6. The method of claim 4, further comprising disabling communication between the first communication device and the device responsive to exiting the sync mode while maintaining communication between the second communication device and the device.

7. The method of claim 1, wherein the transcription data is received at the first communication device without routing the transcription data through the device.

8. The method of claim 1, wherein the transcription data is received at the first communication device after routing the transcription data through the device.

9. The method of claim 1, wherein transmitting the second communication data to the remote transcription system includes routing the second communication data through the device.

10. The method of claim 1, wherein the second communication data is transmitted to the remote transcription system without routing the second communication data through the device.

11. A method to transcribe communications, the method comprising:
    obtaining, by a first device, first communication data;
    transmitting, by the first device, the first communication data to a communication device during a communication session between the first device and the communication device;
    receiving, at the first device, second communication data from the communication device;
    transmitting the second communication data from the first device to a second device that is locally coupled with the first device;
    transmitting, from the second device, the second communication data to a remote transcription system;
    receiving, at the second device, transcription data from the remote transcription system, the transcription data corresponding to a transcription, generated by the remote transcription system, of the second communication data; and
    presenting the transcription of the second communication data.

12. The method of claim 11, further comprising presenting the second communication data by the first device.

13. The method of claim 11, wherein the first device is a mobile device and the second device is a caption device.

14. The method of claim 11, wherein the transcription is presented by the second device.

15. The method of claim 11, wherein the second communication data includes audio data or the audio data and video data.

16. The method of claim 15, wherein when the second communication data includes the audio data and the video data, only the audio data is transmitted to the second device and the remote transcription system.

17. A method to transcribe communications, the method comprising:
    obtaining, by a first device, first communication data;
    transmitting, by the first device, the first communication data to a communication device during a communication session between the first device and the communication device;
    receiving, at the first device, second communication data from the communication device;
    transmitting the second communication data to a remote transcription system;
    receiving, at a second device, transcription data from the remote transcription system, the transcription data corresponding to a transcription, generated by the remote transcription system, of the second communication data; and
    presenting, by the second device, the transcription of the second communication data.

18. The method of claim 17, wherein the second communication data includes audio data or the audio data and video data.

19. The method of claim 17, wherein the first device is a mobile device and the second device is a caption device.

20. The method of claim 17, further comprising presenting the second communication data by the first device.

* * * * *